(12) United States Patent
Bentley et al.

(10) Patent No.: US 6,455,825 B1
(45) Date of Patent: Sep. 24, 2002

(54) USE OF MINIATURE MAGNETIC SENSORS FOR REAL-TIME CONTROL OF THE INDUCTION HEATING PROCESS

(75) Inventors: Anthony E. Bentley, Tijeras, NM (US); John Bruce Kelley, Albuquerque, NM (US); Fred J. Zutavern, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 50 days.

(21) Appl. No.: 09/718,289

(22) Filed: Nov. 21, 2000

(51) Int. Cl.⁷ .................................................. H05B 6/08
(52) U.S. Cl. ................ 219/665; 219/667; 324/203; 324/207.15; 148/567; 266/129
(58) Field of Search ................. 219/665, 663, 219/667; 324/203, 207.15, 207.2, 224; 148/567, 574; 266/129

(56) References Cited

U.S. PATENT DOCUMENTS

| | | | | |
|---|---|---|---|---|
| 3,441,702 A | * | 4/1969 | Bretoniere | 219/652 |
| 3,727,982 A | * | 4/1973 | Itoh et al. | 219/673 |
| 3,860,778 A | * | 1/1975 | Rudd et al. | 219/617 |
| 4,105,971 A | | 8/1978 | Nevalainen | 324/203 |
| 4,107,607 A | * | 8/1978 | Kirkland | 324/224 |
| 4,427,463 A | | 1/1984 | Spies | 148/129 |
| 4,621,176 A | * | 11/1986 | Kliesch et al. | 219/608 |
| 4,675,057 A | | 6/1987 | Pfaffmann et al. | 148/129 |
| 4,769,519 A | * | 9/1988 | Hall | 219/667 |
| 4,816,633 A | * | 3/1989 | Mucha et al. | 219/665 |
| 4,978,917 A | | 12/1990 | Goldenfield et al. | 324/226 |
| 5,250,776 A | | 10/1993 | Pfaffman | 219/10.77 |
| 5,373,143 A | | 12/1994 | Pfaffmann | 219/637 |
| 5,630,957 A | | 5/1997 | Adkins et al. | 219/665 |
| 6,084,224 A | | 7/2000 | Wiezbowski | 219/667 |

OTHER PUBLICATIONS

Robert C. McMaster, Editor Emeritus, Paul McIntire, Editor and Michael L. Mester, Technical Editor, *Nondestructive Testing Handbook, Second Edition, vol. 4, Electromagnetic Testing, Eddy Current, Flux Leakage and Microwave Nondestructive Testing,* Part 1—Automotive Applications of Eddy Current Testing, pp. 424–426.

M. G. Lozinskii, *Industrial Applications of Induction Heating,* Pergamon Press, 1969, pp. 1–21 and pp. 359–365.

\* cited by examiner

Primary Examiner—Philip H. Leung
(74) Attorney, Agent, or Firm—Robert D. Watson

(57) ABSTRACT

A method of monitoring the process of induction heating a workpiece. A miniature magnetic sensor located near the outer surface of the workpiece measures changes in the surface magnetic field caused by changes in the magnetic properties of the workpiece as it heats up during induction heating (or cools down during quenching). A passive miniature magnetic sensor detects a distinct magnetic spike that appears when the saturation field, $B_{sat}$, of the workpiece has been exceeded. This distinct magnetic spike disappears when the workpiece's surface temperature exceeds its Curie temperature, due to the sudden decrease in its magnetic permeability. Alternatively, an active magnetic sensor can also be used to measure changes in the resonance response of the monitor coil when the excitation coil is linearly swept over 0–10 MHz, due to changes in the magnetic permeability and electrical resistivity of the workpiece as its temperature increases (or decreases).

23 Claims, 13 Drawing Sheets

USE OF MINIATURE MAGNETIC SENSORS FOR REAL-TIME CONTROL OF THE INDUCTION HEATING PROCESS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

This application is related to co-pending application, "Acoustic Sensor for Real-Time Control of the Inductive Heating Process", by F. J. Zutavern et al. of Albuquerque, N. Mex., commonly assigned to Sandia Corporation, Albuquerque, N. Mex.

BACKGROUND OF THE INVENTION

This invention relates generally to the field of heat treatment of metals, and more specifically to a method and system of providing real-time, closed-loop control of an induction heating machine by using a miniature magnetic sensor to measure the local changes in magnetic field close to a workpiece during induction heating.

Induction heating is a well-known process for efficiently applying energy directly to metals and other conductive materials for heat treating, melting, welding, brazing, tempering, normalizing, aging, or pre-heating prior to hot working. Induction heating can also be used in non-metal applications, including adhesive bonding, graphitizing carbon, drying, curing, and superheating glass. In induction heating, alternating electric current is passed through an induction heating coil that is positioned closely to a workpiece. Where the lines of magnetic flux produced by the induction heating coil enter the workpiece, the alternating magnetic fields induce an alternating electric potential (e.g. voltage) in the workpiece. The alternating electric potential drives eddy currents in a thin surface layer. These eddy currents dissipate some of their energy within the surface layer by resistive Joule heating losses. The depth of resistive heating (e.g. skin depth) is inversely proportional to the square root of the product of three parameters: applied induction frequency, magnetic permeability, and electrical conductivity. The resultant temperature rise in the resistively heated surface layer is related to the specific heat, density, thermal conductivity, power level, and duration of heating. Magnetic coupling of the induction heating coil to the workpiece depends strongly on the geometrical arrangement, among other properties.

A common use of induction heating is case hardening of medium-carbon steel parts, such as gears, axles, and drive-shafts. Many industrial applications require a steel part having a hardened outer surface (e.g. "case") and an interior region of higher toughness to provide improved strength, wear resistance, fatigue life, and toughness. Other applications include induction hardening of crankshafts, valve seats, railroad rails, rolling-mill rolls, and hand tools. Induction heating rapidly heats the outer surface layer of the steel workpiece in a short period of time (e.g. 5 seconds). Above a critical transition temperature (about 760C for 1050 M steel with 0.45% C) the initial ferrite-pearlite microstructure (BCC) transforms into the austenite phase (FCC).

Upon continued heating of the part, the transformed austenite layer thickens and extends deeper from the surface. Optimum peak surface temperatures can be 870–925 C, depending on the carbon concentration, and the desired depth of hardening. For some applications, the peak surface temperature can be as high as 1200 C. Final hardening of the outer layer occurs when the heating power is shut off and the part is quenched (e.g. rapidly cooled from the outside to less than 200–400 C in 10–20 seconds). This converts the austenitic layer into a hard, metastable martensitic phase with a Rockwell hardness of $R_c$=50–60. An optional tempering step can follow the quench cycle, which can further improve the metallurgical properties.

Induction hardened steel parts are designed to have a case hardened layer with a specific desired depth. For example, a 25 mm diameter 1050 M steel automobile axle may be designed with a hardened layer from 4–5 mm thick, as defined by a Rockwell hardness of at least $R_c$=50. Should the layer be too thin, the axle would wear too quickly or have insufficient strength; should the layer be too thick, the axle would be too brittle. During mass production, the measured case depth should be repeatable to within +/−0.1 mm. This requires close control of the induction heating process, as well as tight control of material properties, chemistry, workpiece alignment, etc.

Closed-loop control of the induction heating and hardening processes has been an elusive goal of the industry for many years. Existing induction hardening equipment is typically operated with open-loop process controllers, wherein an operator manually selects power and time (e.g. heating duration). Production users of this equipment monitor the process by destructively sectioning finished parts and inspecting the results; i.e., a finished part is cut apart and the case depth is directly measured radially across the cross-section by using a Rockwell hardness indentor, metallographic inspection, or chemical analysis of the carbon concentration profile. Process development for new parts is accomplished by time-consuming and expensive trial-and-error; for a given coil and part design, heating and quenching parameters are varied until destructive analysis reveals that the desired hardness profile is being produced.

These parameters are then utilized in the production run and the hardened parts are sampled and analyzed at regular intervals for quality control and assurance. If the tested part is bad, the production run from the previously tested good part is sampled to determine where the process failed. Production equipment may be taken out of service until subsequent parts test satisfactory. Since each test can take a minimum of several minutes by a trained technician, this process is quite inefficient for mass production. Unfortunately, small variations in the steel's chemistry and microstructure can produce unacceptably large variations in the measured case depths, even for nominally acceptable material specifications. The cause of these variations is not well understood.

Other sources of variability include improper part positioning (e.g. misalignment relative to the heating coil), defects in the part (e.g. cracks), and damaged or aged heating coils. Low hardness values measured on a finished part may be caused by: surface decarburization; lower carbon content than specified; inadequate austenitizing temperature; prior structure; retained austenite (mostly in high-carbon steels); and unsatisfactory quenching.

Eddy current testing is a commonly used non-destructive method in the automotive manufacturing industry for measuring case depth. Eddy current testing can measure case depths in hardened shafts over a range from 0.2 mm to 9 mm, with an accuracy of about 0.15 mm RMS error. See Automotive Application of Eddy Current Testing, in *Elec-* tromagnetic Testing, Vol. 4, 2$^{nd}$ ed., Nondestructive Testing Handbook, American Society of Nondestructive Testing, Inc., 1986, p 424–426. However, to achieve this level of accuracy requires the use of a master shaft for calibration purposes. This requires destructive measurement of the case depth in the master shaft by conventional hardness scans. All eddy current responses for the batch of test shafts are then normalized to the response for the master. A computer uses the responses at a few different frequencies to estimate the case depth using multiple linear regression fits. However, this type of eddy-current test is only performed after the part has been induction hardened (e.g. on finished parts); it is not used to provide real-time process control.

What is needed is a real-time, non-destructive, non-contact diagnostic technique that can respond quickly to the temperature changes and phase transformations in the workpiece during the induction heating process. The diagnostic should be small enough to provide sufficient spatial resolution, and robust enough to withstand the hostile environment (high temperatures, high fields, large volumes of quenching fluids, etc.). Use of an active feedback of process information measured directly from the part, coupled with closed-loop control of the heating process, would greatly improve the efficiency of induction hardening systems, while increasing accuracy and reducing part rework.

Direct measurement of the workpiece's surface temperature during induction heating could provide a useful signal for closed-loop feedback control. However, use of contact thermocouples is impractical for mass production, especially since cylindrical parts are often rotated at significant rpm's to create uniform heating profiles. Non-contact optical pyrometry could be used, however the accuracy is affected by surface conditions (e.g. emissivity) and the operating environment (e.g. smoke, dust, vapors). Coating of the pyrometer's window by the quenching fluid can also degrade accuracy. Commercially available pyrometers do not have a sufficiently fast response time to monitor the rapid changes in surface temperature during induction heating. Neither pyrometry, nor surface-attached thermocouples, can directly measure the internal temperatures within a workpiece.

Indirect measurement of the workpiece's temperature, and/or temperature profile through the depth, can be inferred by measuring corresponding changes in the electrical and magnetic properties of the workpiece as it heats up during induction heating. It is well known that the electrical resistivity increases with temperature for typical metals, including steel. For example, the resistivity of medium-carbon steels can increase as much as 800% as the temperature increases from 20 C to 900 C. See ASM Handbook, Vol. 4, Heat Treating, 1991, p. 187.

The average electrical resistance of the workpiece (e.g. averaged over the cross-sectional area) can be measured indirectly by monitoring the voltage, current, and phase of the induction heating coil. This approach is described in U.S. Pat. No. 5,630,957 (commonly assigned to Sandia Corporation), which is herein incorporated by reference. In this patent, Adkins et al. teach a method of closed-loop control of an induction hardening machine that uses a trained neural network processor, combined with real-time measurement of the voltage, current, and phase in the induction coil, as measured by a Rogowski coil surrounding a current lead. The depth of hardening is controlled, in part, by computing the energy absorbed by the workpiece, and the changes in the average resistance of the coil plus the workpiece during the heating duration. However, this method does not provide any information regarding the temperature profile through the depth, or local information at a specific point on the workpiece.

A non-contacting, miniature magnetic sensor could be used for measuring the changes in surface magnetic fields near the workpiece in real-time during induction heating. A magnetic sensor responds to a time-varying magnetic field by generating a time-varying EMF (e.g. voltage) in the sensor's monitor coil. As the workpiece heats up, changes in the electrical, magnetic, and microstructural properties of the heated surface layer affect the surrounding surface magnetic fields. A magnetic sensor positioned in close proximity to the surface could detect these changes. The output signals from such a sensor could provide useful information for controlling and optimizing the operation of an induction heating machine.

Magnetic sensors can be divided into two groups: active and passive. Active sensors provide their own excitation fields by using a driving coil (e.g. transmission coil or excitation coil). A second sensor coil (e.g. a monitor coil or probe coil responds to the time-varying magnetic field generated by the driving coil, which it is coupled through the workpiece. The excitation frequency of active sensors could be independently varied (e.g. 0–10 MHz), and could be much faster than the frequency of induction heating (e.g. 7 kHz). Use of a variable excitation frequency could provide the ability to probe the workpiece at varying depths, since the skin depth is inversely proportional to the square root of the driving frequency. Active sensors could also be used when the induction heating coil is temporarily at rest (e.g. during periodic pulsed heating), or during the cooling cycle (e.g. during quenching), when the induction heating coil is turned off. This is because active sensors provide their own source of excitation.

Active magnetic sensors can utilize a ferrite core to concentrate the magnetic flux, which improves overall performance. In this case, the monitor coil can sense four components of the total magnetic field: (1) the induction heating field, coupled through the workpiece and the ferrite core; (2) the magnetic field produced by eddy currents in the workpiece, in response to the induction heating field; (3) the high frequency excitation field, coupled through the ferrite core and workpiece; and (4) the magnetic field produced by eddy currents induced in the workpiece by the high frequency excitation field. Generally, the very small currents induced in the ferrite core can be neglected because of its high electrical resistance. Therefore, the only significant eddy currents are those inside of the workpiece. The magnetic loop includes the ferrite core and some portion of the workpiece. The magnetic field in the ferrite core depends, therefore, on all of the fields generated inside the workpiece, coupled through the magnetic loop.

Frequency filters could be used to eliminate either the high frequency (e.g. sensor excitation) or the low frequency (e.g. induction heating) components, as well as to control electromagnetic interference (EMI). Also, examination of the phase shift could be used to distinguish between these different magnetic components. Additionally, changes in the orientation of the excitation coil, the monitor coil, the ferrite core, and/or the workpiece could be used to selective emphasize either the coupled applied field, the eddy-current field, or both.

Passive magnetic sensors, on the other hand, do not have an independent excitation coil. Rather, they respond "passively" to time-varying changes in the local surface magnetic field produced by two sources: (1) the magnetic field of the induction heating coil interacting (e.g. coupling) with the workpiece, and (2) the magnetic fields generated by the induced eddy currents that heat the workpiece. Consequently, the frequency measured by the passive magnetic sensor is nominally fixed by the induction heating frequency (e.g. 7 kHz). Despite the fixed frequency limitation, a passive sensor could be simpler, less expensive, and easier to instrument than an active sensor. Passive sensors could also detect the Curie temperature effect (to be discussed later).

Passive magnetic sensors could be used to monitor intra-cycle changes (e.g. during an active heating cycle) in the surface magnetic field during induction heating.

Magnetic sensors could be miniaturized (e.g. 1–2 mm diameter coil), to provide enhanced spatial and temporal resolution. Additionally, multiple sensors could be placed at various axial locations along an axle or driveshaft to monitor axial variations in the process. This could be applied for a continuous hardening process, where the workpiece is moving sequentially through a fixed set of induction heating coils and quench stations. Alternatively, multiple sensors could be used avantageously for complicated parts that are being heated simultaneously with multiple induction heating coils, each being controlled by individual controllers coupled to their own sensors.

Although the use of active magnetic sensors have been proposed for controlling induction heating machines, numerous problems exist with these methods. In U.S. Pat. Nos. 5,250,776 and 5,373,143, Pfaffmann teaches a method of using an eddy current sensor to "measure" the temperature of a part during the induction heating process. The method relies on the known increase in electrical resistivity as the workpiece heats up, causing a corresponding change in the impedance of an electromagnetic test coil placed adjacent to the metal part. See *Introduction to Electromagnetic Nondestructive Test Methods*, by H. L. Libby, John Wiley & Sons, Inc., 1971, p. 272.

Pfaffmann teaches that because of significant electromagnetic interference (EMI) produced by the induction heating machine, useful analysis of the eddy currents sensed by the eddy current sensor is impaired and, hence, real-time monitoring is not attainable. To get around this problem, Pfaffmann's method specifically restricts the use of the eddy current sensor to periods of time when the induction heating coil is deliberately turned off.

Pfaffmann's method is illustrated in FIG. 1. Here, the induction heating coil power is turned off at periodic intervals for short periods of time (e.g. 10 milliseconds). During the period of no heating, the excitation coil of the eddy current sensor is energized, thereby inducing eddy currents in the workpiece, which are detected by the sensor coil. Pfaffmann thereby eliminates the problem of electromagnetic interference by operating the eddy current sensor only when the induction heating coil is deliberately turned off.

Unfortunately, Pfaffmann's method eliminates the possibility of using a simpler and cheaper passive magnetic sensor, since there is no excitation field to drive the passive sensor when the induction heating coil is deliberately turned off. Another disadvantage of Pfaffmann's method is that additional electronic equipment is required to create, control, and synchronize the timing of the coordinated patterns for turning on and off the induction heating power, while simultaneously activating the eddy current sensor, thereby adding additional costs and system complexity.

Important process information may not be gathered because the large magnetic field created by the induction heating coil is missing. For example, the saturation of the induced magnetic field, $B_{sat}$ (in ferromagnetic materials) inside of the heated surface layer is artificially missing when the induction heating coil is deliberately turned off. Additionally, commonly used commercial induction heating machines that operate on a continuous "harmonic" cycle do not have a natural downtime in the heating cycle. Therefore, costly modifications of their electronics and control circuitry would be required to create the downtime period. Pfaffmann does not discuss the important effects of the Curie Temperature on the magnetic permeability, which strongly influences the induction heating process (to be discussed later).

In addition to detecting electrical properties, miniature magnetic sensors could be used to detect changes in the magnetic properties of a workpiece, including: (1) hysteresis in the magnetic permeability, and (2) the Curie temperature effect.

Changes in the relative magnetic permeability, mu, (e.g. relative to the free space permeability) that occur during heating are important to understand because the depth of induction heating is inversely proportional to the square root of the magnetic permeability. For soft ferromagnetic materials the permeability is a strong non-linear function of the applied magnetic field. The permeability is defined as the ratio of the Induced Field, B (Teslas), divided by the Applied Field, H (A/m). Above a certain applied field, the induced field saturates at an essentially constant value, $B_{sat}$, which is about 1.5–2 Teslas for medium-carbon steels. This is important because the magnetic field applied by the induction heating coil typically drives the surface of the workpiece well beyond magnetic saturation twice during each cycle (both positively and negatively). During saturation, when all of the magnetic domains align with the magnetic field, the induced eddy currents penetrate more deeply into the part because the permeability, mu, is much smaller inside the saturated zone.

Because alternating current drives the induction heating coil, the workpiece is subjected to an alternating applied magnetic field. Soft ferromagnetic materials respond with a hysteresis in their induced field, B, when the applied field, H, is cycled between maximum and minimum values, as shown in FIG. 2. Energy lost during AC magnetization is converted into heat in the ferromagnetic material, and can be represented, in part, by the area inside the hysteresis loop. The slope (e.g. permeability) of the hysteresis loop, and the flat-top (saturation field, $B_{sat}$), both depend on the temperature, driving frequency, carbon content, microstructure, and other properties of the workpiece. FIG. 3 shows an example of how a typical B-H hysteresis loop changes with temperature for 1050 M medium-carbon steel at 5000 Hz. Increasing the temperature from 100 C to 700 C decreases the saturation field ($B_{sat}$) by roughly a factor of two. The permeability is also affected by temperature changes. These changes in magnetic properties significantly affect the heating profile through the depth, and, therefore, the temperature rise during induction heating.

Ferromagnetic materials undergo a dramatic transition from being a "magnetic" material with a large relative magnetic permeability (mu~100–1000), to being a "non-magnetic" material (mu=1) when heated above the Curie temperature. The cause of the Curie effect is closely related to the phase transformation that occurs during heating, passing from a 100% ferrite-pearlite BCC microstructure when the temperature is below the $A_{c1}$ line, to a 100% austenitic FCC microstructure when above the $A_{c3}$ line. For steels with carbon concentrations less than about 0.45 wt %, the Curie temperature is relatively constant at about 770 C. In higher carbon steels the Curie temperature follows the $A_3$ line on the Fe—C phase diagram to the eutectoid composition; thereafter, it coincides with the $A_1$ line.

Both the Curie temperature and the ferrite-to-austenite phase transformation during heating are affected by many factors, including the rate of heating, the starting microstructure (e.g. annealed, normalized, quenched and tempered), grain size, carbon content, trace elemental composition, and possibly magnetic field, frequency, and stress state. When the heated surface exceeds the Curie temperature, austenite begins to form and the magnetic permeability rapidly drops to mu=1. Consequently, the induction heating magnetic field rapidly penetrates more deeply into the part. Continued heating increases the thickness of the austenite layer, until the desired depth is reached. Finally, the heating coil is turned off and the part is quenched, thereby forming a hard martensite surface layer.

Because the Curie temperature effect coincides closely with the beginning of austenite formation upon heating, the time after start of heating at which the Curie temperature is reached at the surface could be used as a sensitive indicator of how fast the workpiece is heating up. For example, if the Curie temperature is reached too quickly, this could indicate that too much power is being delivered to the workpiece, resulting in too great a case hardening depth. Likewise, if the Curie temperature signal is detected too late in the process, the case depth could be too shallow. Either condition could result in rejection of the part.

The heating process could be adjusted after the Curie temperature has been reached (and detected) by changing the power level of the induction heating coil, or by adjusting the heating duration (e.g. stop time), so that the desired depth of case hardening is precisely achieved. Because miniature magnetic sensors can detect the Curie temperature effect, they are well suited to provide critical information useful for actively controlling the induction heating process. This applies not only for induction hardening, but also for high temperature annealing or normalizing of steel and cast iron parts, using similar induction heating methods.

Additionally, analysis of the sensor's response throughout the induction heating process could provide important information regarding the temperature profile through the depth, and the rate of heating over time, before the Curie temperature point has been reached. Likewise, similar information could be obtained during cooling when the Curie point is traversed when cooling down from a temperature above the Curie temperature point.

DETAILED DESCRIPTION OF THE INVENTION

This invention relates to a method and system of providing real-time, closed-loop control of an induction heating machine by using a miniature magnetic sensor to measure the local changes in magnetic field close to a workpiece during induction heating.

Figure 4:
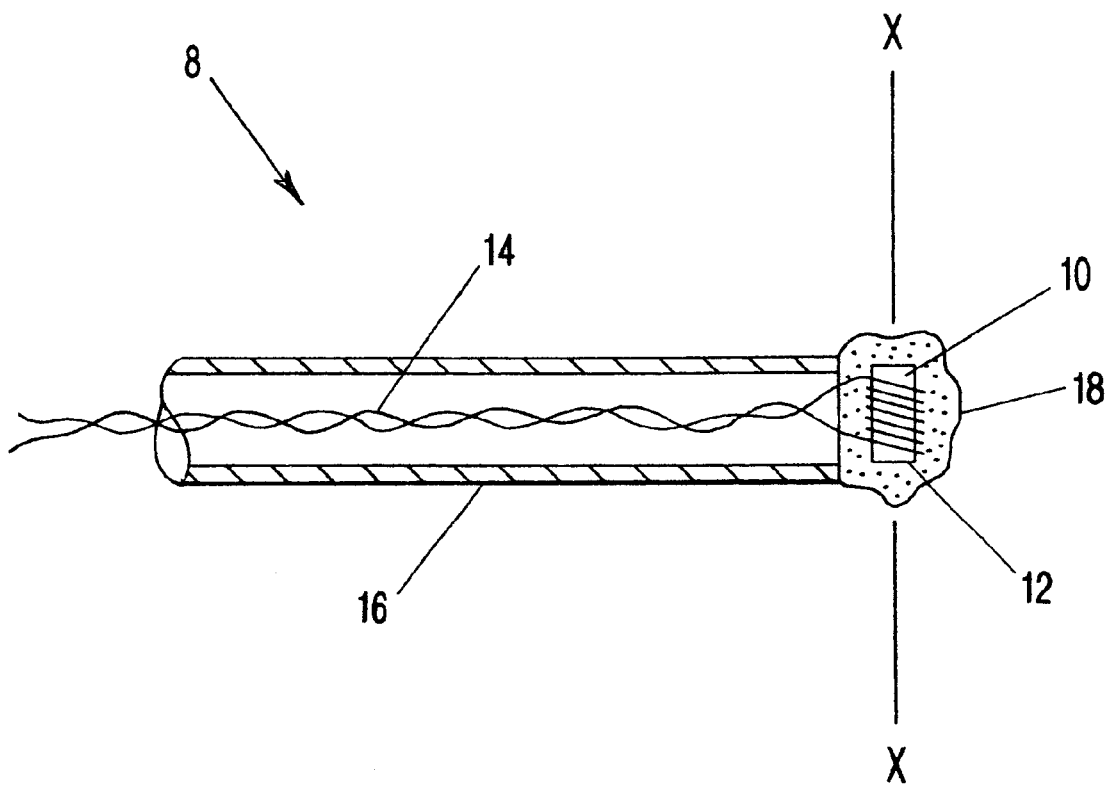
FIG. 4 shows a first schematic example, according to the present invention, of a passive magnetic sensor.

FIG. 4 shows a first schematic example of a passive magnetic sensor 8, according to the present invention. The sensing element of passive inductive sensor 8 is a miniature inductive coil 10. Coil 10 is wound tightly to obtain reasonably high spatial resolution. Coil 10 can be wound on core 12. Core 12 can be a ceramic material to withstand the heat radiated from the surface of the part, and so that eddy currents would not be induced in the sensor core. The wire can be 30 gauge copper wire, wound on a ceramic rod 12 approximately 1–2 mm in diameter. The coil's sensitivity can be increased by using a laminated ferromagnetic or ferrite core. However, this can introduce the complication of unwanted eddy currents in the core of the sensor at certain orientations. The output voltage can be increased by increasing the number of turns in coil 10. Coil 10 can have 50 turns, for example. Coil leads 14 can be twisted to minimize pickup of unwanted electromagnetic interference. Coil 10 can be held in close proximity to the surface of the workpiece (not shown) with a support member 16. Support member 16 can be a hollow tube, made of glass, ceramic, non-magnetic stainless steel (e.g. 304, 316 SS) or any non magnetic, high resistivity structural material that is substantially not heated by the induction heating process. Twisted pair leads 14 are passed through supporting member 16 to 50 Ω coaxial connectors and cables, which transmit their signals to a 50 Ω terminated high (e.g. 1 GHz) bandwidth digital oscilloscope.

Coil 10 and core 12 can be encased in an electrically insulating material 18. Material 18 can also be used to attach coil 10 and core 12 to support member 16. Epoxy was used initially to hold coil 10 in place, but the heat from the inductive hardening process burnt the edges of the epoxy. An inorganic adhesive has been tested which can withstand high temperatures, but it is slightly soluble in water, and the quenching liquid may eventually dissolve this adhesive. A preferred material 18 is a water-insoluble, high temperature, insulating adhesive. A three-dimensional micro-manipulator (not shown) can be used to accurately position sensor 8 with respect to the workpiece. Sensor 8 can be mounted to extend through gaps in between sections of the quench head (not shown). The orientation of the coil's major axis, X—X, can be adjusted with respect to the workpiece until the optimum output signal is obtained.

Passive magnetic sensors can respond to at least two components of the total surface magnetic field. A first component can be the field generated by the induction heating coil. A second component can be the field generated by eddy currents flowing in the workpiece, where these eddy currents have been induced by the action of the induction heating coil. Coil orientation can be chosen to select the applied magnetic field or the magnetic field from the induced eddy currents.

Experiments were performed using two different passive magnetic sensors, and with different orientations with respect to the workpiece. The workpiece was a 1 inch diameter by 4 inch long bar of 1040 M steel (medium-carbon). The steel bar was heat treated in a single-shot inductive hardening machine located at Sandia National Laboratories in Albuquerque, N. Mex. The part was heated for a 5 s period to a surface temperature of approximately 1200 C, followed immediately by a 20 s quench with a liquid bath. Signals from the two miniature coils, along with the signals used to control the machine (e.g. heating voltage and current), were recorded simultaneously with a 1 GHz bandwidth oscilloscope. Many tests were performed to optimize the sensors and evaluate their sensitivity changes with respect to orientation, location, power, and type of material being treated.

The two sensors, designated Coil A and Coil B, were mounted near the surface of the bar through a gap between the quench heads. The bar was rotated about its vertical (e.g. long) axis at 12 Hz to improve the uniformity of heating. The axis of coil A was aligned radially (horizontally) from the bar. The axis of coil B was tangential to the surface of the bar and changed from vertical to horizontal between tests. Coil A was located directly above coil B by approximately 5 mm. Both coils were initially located near the top of the bar and centered horizontally in the gap between the quench heads. At this location they were most sensitive to the current flowing in the horizontal plane near the end of the heating coil. Next, they were moved to the center of the bar vertically, where they were most sensitive to the current which was flowing in the vertical segments of the coil. In this location, coil B was very close to a null in the component of the magnetic field along its axis, so the sensors were rotated horizontally about the axis of the part by 5–6 mm. The part was heated with repetitive, nearly sinusoidal pulses (e.g. cycles). The induction heating machine can adjust the "dead" time between the pulses to adjust the power delivered to the part.

Figure 5:
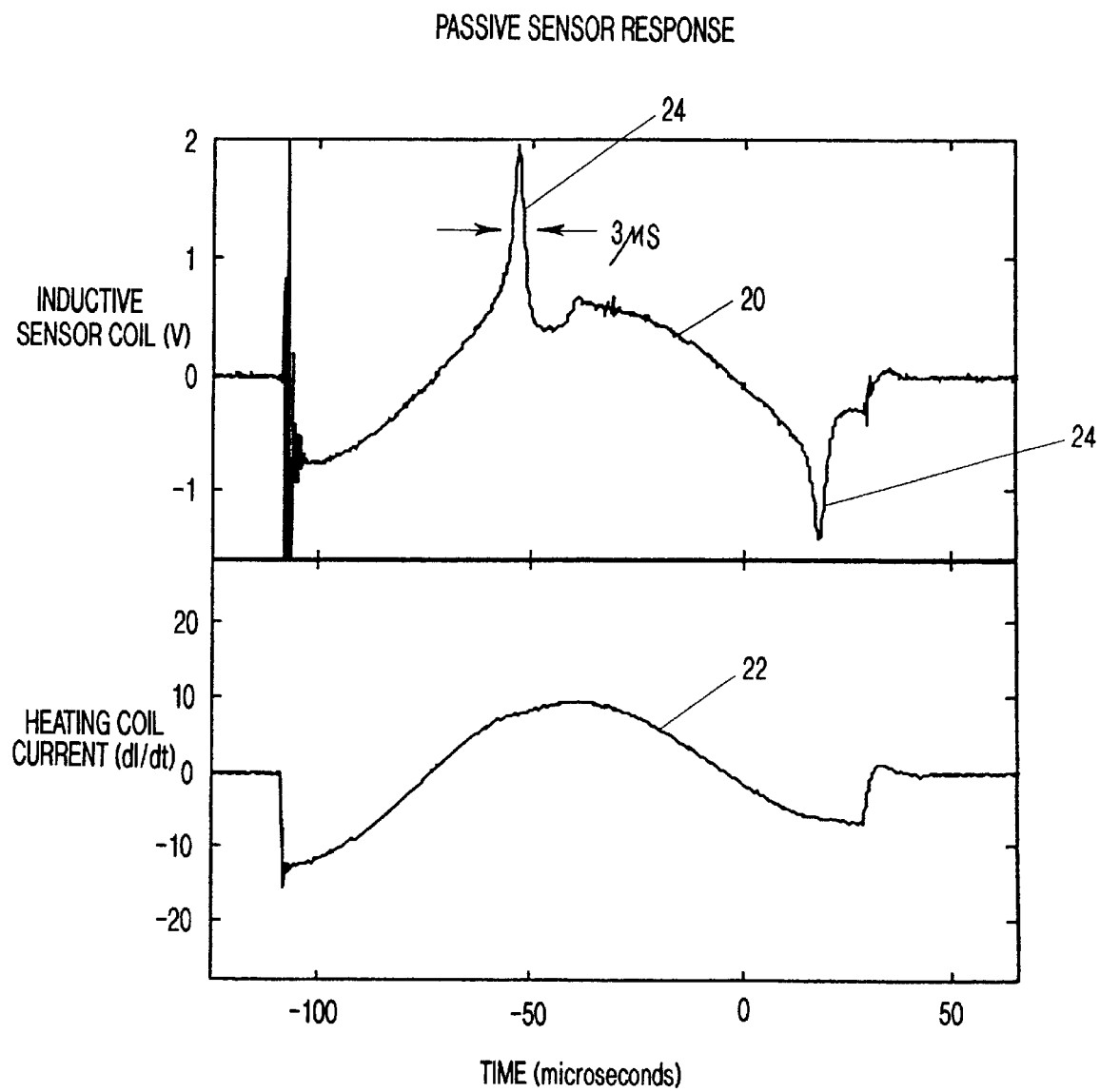
FIG. 5 shows a first example, according to the present invention, of the response of a passive magnetic sensor during a single cycle of induction heating, compared to the current in the induction heating coil, as measured by a Rogowski coil. The magnetic "spike" can be observed, caused by local saturation of the magnetic properties.
Figure 6:
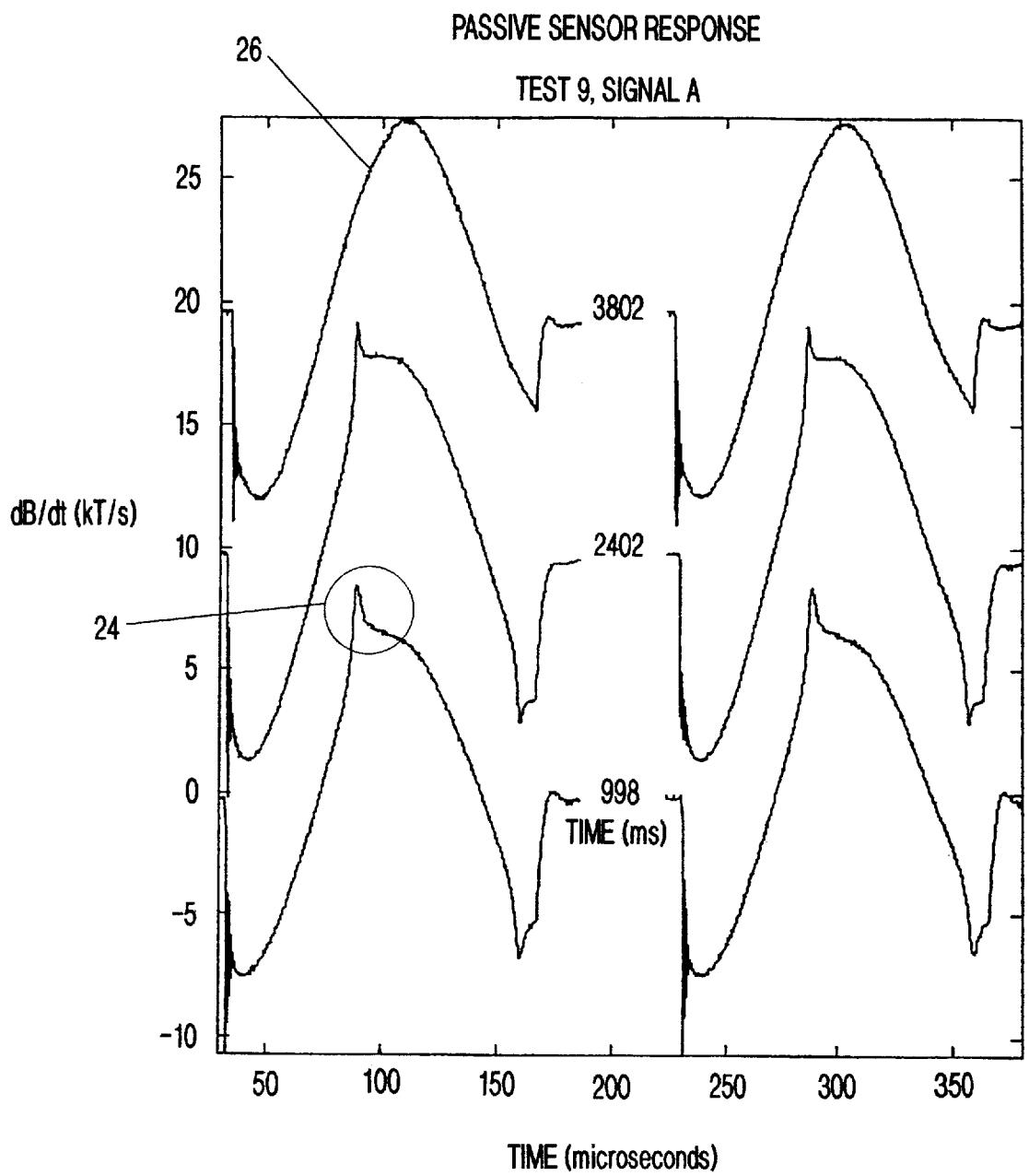
FIG. 6 shows a second example, according to the present invention, of the response of a passive magnetic sensor during three pairs cycles of induction heating, stacked on top of each other, and taken at three different times during the heating period, 998 ms, 2402 ms, and 3802 ms after the start of heating. The disappearance of the magnetic "spike" can be observed, which corresponds to the Curie temperature point.
Figure 7:
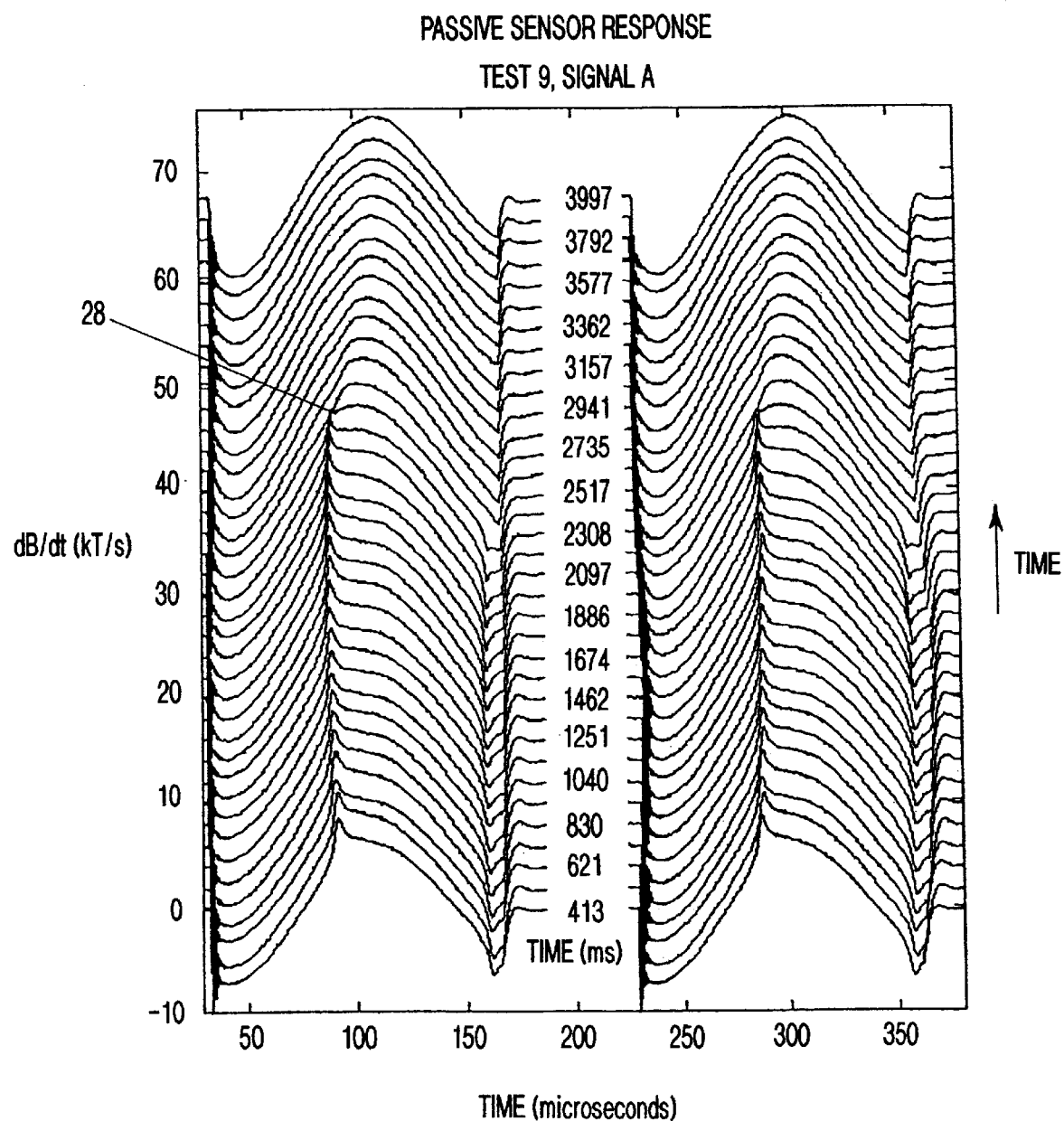
FIG. 7 shows a third example, according to the present invention, of the response of a passive magnetic sensor during multiple cycles of induction heating, stacked on top of each other. The disappearance of the magnetic "spike" can be observed, which corresponds to the Curie temperature point.

Since the oscilloscope which records the signals did not have enough memory to save high resolution waveforms for every pulse, it was set to record a pair of pulses and then skip 52 pulses before recording another pair. In this way, roughly 400 pairs of pulses were saved for all four sets of signals (coil A, coil B, voltage, and current) throughout the 5 s heating period. The heating frequency was 5000 Hz. Some of these waveforms are shown in FIGS. 5, 6, and 7. In FIGS. 6 and 7, each curve shows two heating cycles. Multiple curves are displayed by shifting them vertically as they increase in time. The starting time is written in the center. As can by comparing the start times, the time between curves is much longer than the duration of each curve. In other words, many heating cycles are skipped between curves. The gradual change in the magnetic properties of the surface of the bar as it is heated is indicated by the gradual change in shape and location of the non-sinusoidal features (e.g. spikes) of these waveforms.

FIG. 5 shows a first example, according to the present invention, of the response of a passive magnetic sensor during a single cycle of induction heating (e.g. the "intra-cycle" response). Curve 20 shows the voltage response of the sensor coil. Curve 22 shows the "raw" response of the Rogowski coil (dI/dt), which is related to the current flowing in the induction heating coil. Curve 22 shows a reasonably smooth sinusoidal shape, whereas curve 20 has two distinct spikes 24 in each cycle. A comparison of these two response curves indicates that the Rogowski coil measurements (e.g. curve 22) are not as sensitive as the miniature magnetic sensor coil (e.g. curve 20).

The magnetic field, which induces current in the part being heated, only penetrates a small distance below the surface called the "skin" depth. This depth is inversely proportional to the square root of three important parameters: (1) the frequency of the alternating magnetic field, (2) the resistivity of the part, and (2) the magnetic permeability of the part. As it heats up, the resistivity of the shell increases and the magnetic field penetrates deeper.

Figure 1:
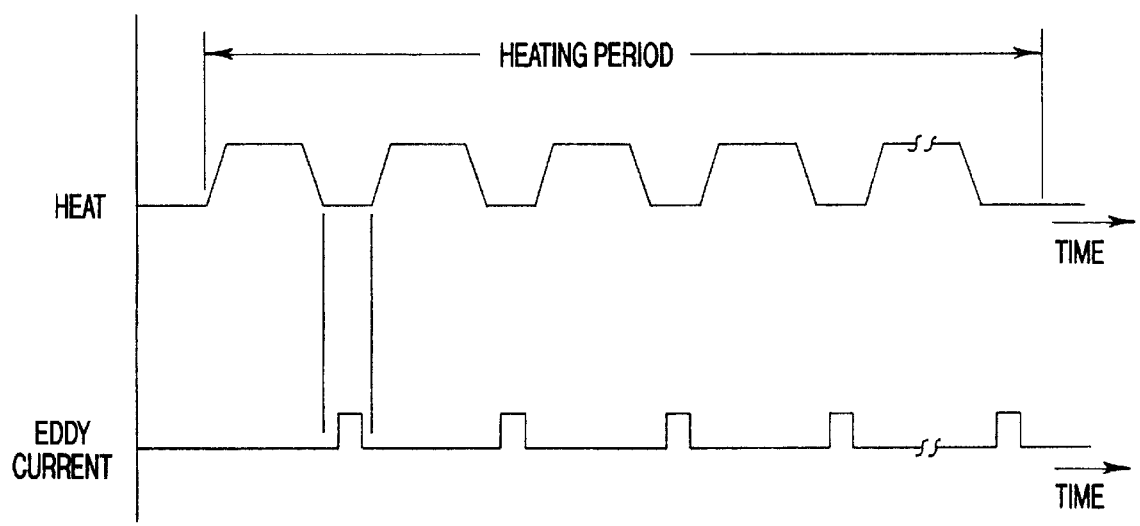
FIG. 1 (prior art) illustrates the method described in U.S. Pat. No. 5,373,143 to Pfaffmann, where the eddy current sensor is activated only during periods of time where the inducting heating coil is turned off and deactivated, which eliminates problems with the eddy current sensor due to electromagnetic interference by the heating coil.
Figure 2:
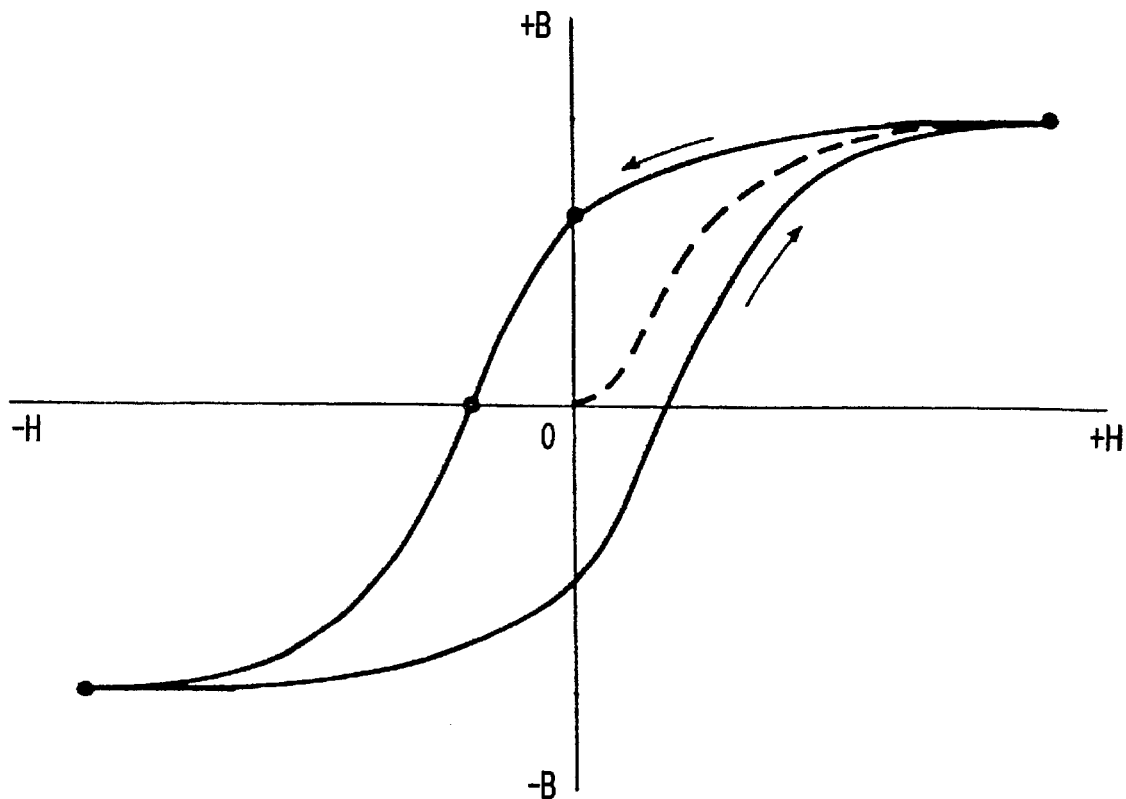
FIG. 2 shows a schematic hysteresis loop for a ferromagnetic material, where "H" is the applied field (A/m), and "B" is the induced field (Tesla).
Figure 3:
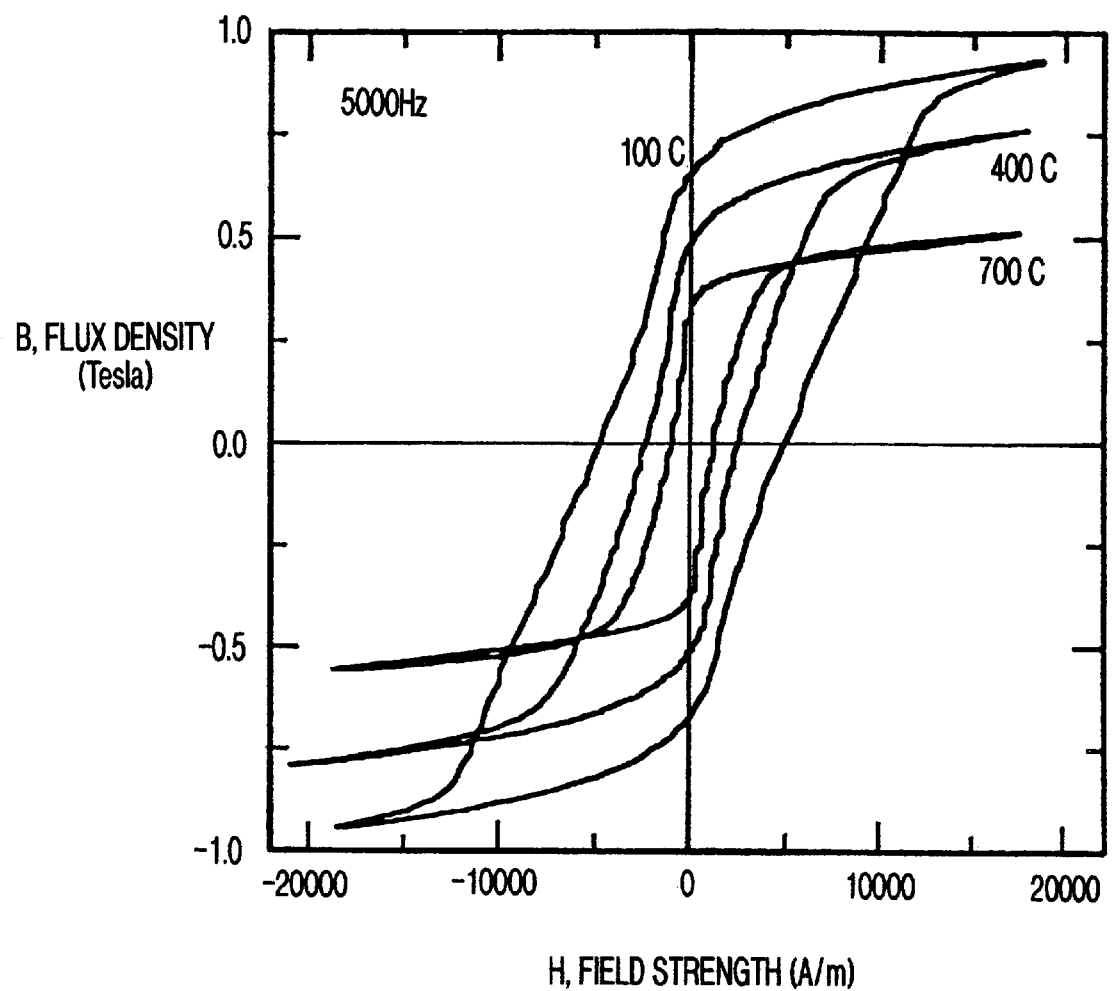
FIG. 3 shows measured hysteresis loops for a 1050 M medium-carbon steel, taken at 5000 Hz, at three different temperatures, 100 C, 400 C, and 700 C.

Magnetic fields in and near magnetic materials exhibit very non-linear behavior as they oscillate in and out of saturation in positive and negative directions, as illustrated in FIGS. 2 and 3. As the current is increased, regions of the material known as magnetic domains align with the magnetic field. Once all the domains have aligned, increased current causes a much slower rate of increase in the magnetic field, as if the material had lost its magnetic properties. In an induction heating machine, the magnetic fields near the surface go well beyond saturation twice during each heating cycle. This causes a sudden increase in the magnetic field deeper in the part and a sudden perturbation in the field near the surface of the part. This sudden perturbation is the source of the spikes 24 observed by inductive sensor 8 in FIG. 5. The width of spike 24 in FIG. 5 is only about 2–3 microseconds. Because the transient of spike 24 is so fast, this is one reason why a high bandwidth oscilloscope was used to record the signals.

At high currents or applied field (H), the relative magnetic permeability, mu, goes to 1, so technically the magnetic field (B) continues to vary but with a much smaller modulation while it is on the saturated portion (ends) of the B-H loop. Saturation occurs at the ends of the B-H loop, where essentially all of the magnetic domains are aligned with the applied field and a further increase in the applied field (H) serves to increase the magnetic field (B) directly without the assistance of additional magnetic domains. The applied magnetic field penetrates deeper, because the magnetic permeability has decreased by a factor of about 1000. The skin depth is inversely proportional to the square root of (magnetic permeability x conductivity x frequency). The magnetic field (B) and applied field (H) continue to track the B-H loop during each cycle. A sinusoidal time-varying applied field produces a rectangular time-varying B-field because the B-field continues to change very rapidly when it crosses zero, but changes very slowly near the ends of the B-H loop. The higher the current, the farther out the linear ends of the loop extend, and the more rectangular is the time-varying B-field.

A reasonable approximation for the B-H loop can be given by:

$$B = B_0 \tan h((u_u - u_s)(H - / + H_c)) + H u_s$$

where −/+ indicate the lower/upper branch u represents magnetic permeability subscripts s and u represent saturated and unsaturated $H_c$, represents the width of the B-H loop (coercive applied field)

$B_0$ represents the height of the B-H loop (saturated magnetic field)

FIG. 6 shows a second example, according to the present invention, of the response of magnetic sensor 8 during three pairs cycles of induction heating. The three curves are stacked on top of each other, and were taken at three different times during the heating period, 998 ms, 2402 ms, and 3802 ms after the start of heating. The time derivative of the magnetic field, dB/dt, is plotted. This quantity is proportional to the voltage induced on the sensor coil A by the time-varying surface magnetic field surrounding the workpiece. The numerical integral of this signal, i.e. the magnetic field, can also be plotted for comparison. The non-sinusoidal effects are much more evident in the derivative dB/dt (e.g. "raw" signal) from the sensor coil then in the-integrated signal. However, a careful comparison of the integrated signal with a damped sinusoidal curve also reveals significant non-sinusoidal components. The disappearance of the magnetic spike 24 can be readily observed between 2402 ms and 3802 ms. Curve 26 (at 3802 ms) shows no evidence of having a magnetic spike 24 (e.g. the response is smooth). As will be explained next, the disappearance of the magnetic spike 24 is believed to correspond to the point in time, $t_{curie}$, when surface temperature exceeds the Curie temperature.

As the part continues to heat up, the region being saturated moves deeper. The saturation effects near the surface of the bar cause a slight change in the circuit inductance during the heating cycle, which produces a slight shift in frequency or "chirp." At some point, the outside of the shell begins to approach the Curie temperature, where the material loses its magnetic properties. When the surface temperature reaches the Curie temperature, the magnetic domains no longer align and the saturation effect disappears at the surface region. Above the Curie temperature the magnetic permeability decreases by a factor of approximately 1000. Consequently, the magnetic field suddenly penetrates much deeper. Since the surface is no longer cycling between positive and negative magnetic saturation, the magnetic spikes 24, disappear. This can be observed in FIG. 6.

FIG. 7 shows a third example, according to the present invention, of the response of a passive magnetic sensor during multiple cycles of induction heating. Multiple curves are stacked on top of each other, as before. The disappearance of the magnetic spike 24 can be readily observed, corresponding to the Curie point magnetic transition 28. In this example, $t_{curie}$, =2.52 seconds.

The experiments also provided evidence that these coils (e.g. Coils A and B) can resolve different heating rates and, hence, different hardening depths at different locations on the part. Because the non-sinusoidal shape of the sensor response goes through the Curie point magnetic transition 28 earlier in the coil located near the top of the bar (plot not shown), we concluded that the bar was being heated faster near the top. This is confirmed by visual observation of the surface temperature, because the bar gets brighter (whiter) near the top than at the center. It is consistent with the shape of the "hairpin" heating coil, which has only vertical components near the center of the bar, but has vertical and horizontal components near the top.

Data was taken for parts heated with power settings of 600, 700, and 750 (arbitrary units). The higher power level causes the transition to occur sooner in time, and the first indication of a significant change in the magnetic signal was at 3.3, 2.4, and 2.1 seconds, respectively. This is a clear demonstration that the signals from the sensor coils track the Curie point magnetic transition 28 and can provide the information necessary to predict case depth.

Figure 8:
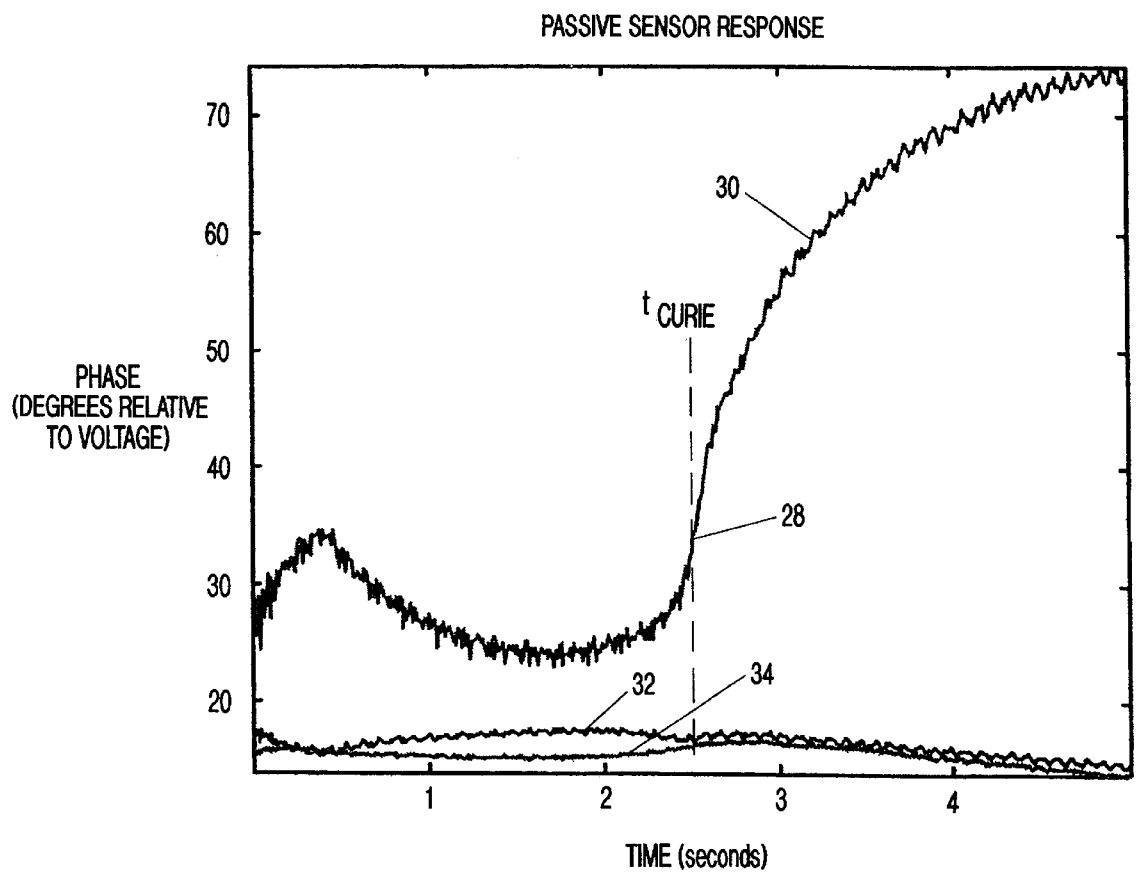
FIG. 8 shows a fourth example, according to the present invention, of the response of a passive magnetic sensor during induction heating. The sudden shift in the phase angle corresponds to the Curie temperature point.

FIG. 8 shows a fourth example, according to the present invention, of the response of a passive magnetic sensor during induction heating. Curve 30 shows the phase angle, in degrees relative to voltage, of sensor 8 during the 5 second heating period. In Curve 30, sensor 8 is oriented parallel to the "eddy" fields. Curve 32 shows the phase angle response when the sensor 8 is oriented parallel to the applied fields. Curve 36 shows the phase angle response of the Rogowski current monitor. The sudden shift in the phase angle in Curve 30 that occurs at 2.5 seconds corresponds to Curie point magnetic transition 28. In this example, $t_{curie}$, =2.5 s.

To observe sensor response to a non-magnetic material, measurements were made on INCONEL 600. The magnetic sensor coil signals looked identical to the current derivative from the Rogowski monitor. This implies that the non-sinusoidal effects (e.g. spikes 24), observed with magnetic materials are caused predominately by magnetic saturation effects, which only occur in magnetic materials (as opposed to eddy currents, which occur in both magnetic and non-magnetic conductors).

Data were also taken on an induction heating machine used for annealing, that was located at Chrysler, Inc. Analysis of the data showed magnetic effects that changed in time, even though the material was heated more slowly than on a typical inductive hardening machine. The axial rotation of the part was easily observed because there was a cut in bar which temporarily reduced the magnetic fields at the sensor coil.

The present invention utilizes electronic analog and/or digital filter to minimize the problem of electromagnetic interference produced by the induction heating coil. Proper probe orientation is also important because good alignment of the long axis of the sensor coil 10, e.g. axis X—X, parallel to the lines of magnetic flux to be measured, can maximize the sensor's output signal. Conversely, the coil's axis X—X can be aligned perpendicular to the lines of magnetic flux to minimize the output signal. In this way, various types of magnetic fields can be filtered out by proper probe orientation. One example would be minimizing the magnetic field due to the induction heating coil, while maximizing the field generated by eddy currents in the workpiece, simply by aligning the coil's X—X axis parallel to the eddy current induced field, and perpendicular to the heating coil field. As such, the present invention can operate the magnetic sensors during the time when the induction heating coil is energized. It is not necessary to turn the heating coil off. This is an especially useful advantage for FET-based inductive heating machines that provide continuously pulsed, near-sinusoidal operation, without any quiet or "dead" time.

A first example, according to the present invention, of a method of detecting the time, $t_{curie}$, as measured from the start of induction heating, when the surface temperature of a ferromagnetic workpiece has exceeded the Curie temperature during induction heating, can include the following steps: providing a ferromagnetic workpiece having a region that is being heated by an induction heating coil, the workpiece having a time-varying surface magnetic field; placing a magnetic sensor (either passive or active) in close proximity to the heated region; measuring the sensor's response to the time-varying surface magnetic field, while the workpiece is being inductively heated; calculating the time rate of change of the surface magnetic field, dB/dt, as a function of time, from the sensor's output; plotting the intra-cycle variation in dB/dt versus time for at least one cycle of induction heating; identifying a characteristic spike 24 in the plot of dB/dt versus time, caused by a perturbation in the surface magnetic field due to saturation of the magnetic permeability; identifying when spike 24 disappears, due to the loss of magnetic properties when the workpiece surface temperature exceeds the Curie temperature (e.g. Curie point 28); and subsequently identifying the time, $t_{curie}$, when spike 24 disappearance occurs.

A second example, according to the present invention, of a method of detecting the time, $t_{curie}$, as measured from the start of induction heating, when the surface temperature of a ferromagnetic workpiece has exceeded the Curie temperature during induction heating, can include the following steps: providing a ferromagnetic workpiece having a region that is being heated by an induction heating coil, the workpiece having a time-varying surface magnetic field; placing a magnetic sensor (either passive or active) in close proximity to the heated region; measuring the sensor's response to the time-varying surface magnetic field, while the workpiece is being inductively heated; calculating the phase angle of the sensor's output relative to the phase of the applied induction heating field; plotting the intra-cycle phase angle versus time, over the period of induction heating; identifying a characteristic shift 28 in the plot of phase angle versus time, due to the loss of magnetic properties when the workpiece surface temperature exceeds the Curie temperature; and subsequently identifying the time, $t_{curie}$, when the characteristic shift 28 occurs.

Use of an active feedback of process information measured directly from the workpiece, coupled with closed-loop control of the heating process, can greatly improve the efficiency of induction hardening systems, while increasing accuracy and reducing part rework.

Figure 9:
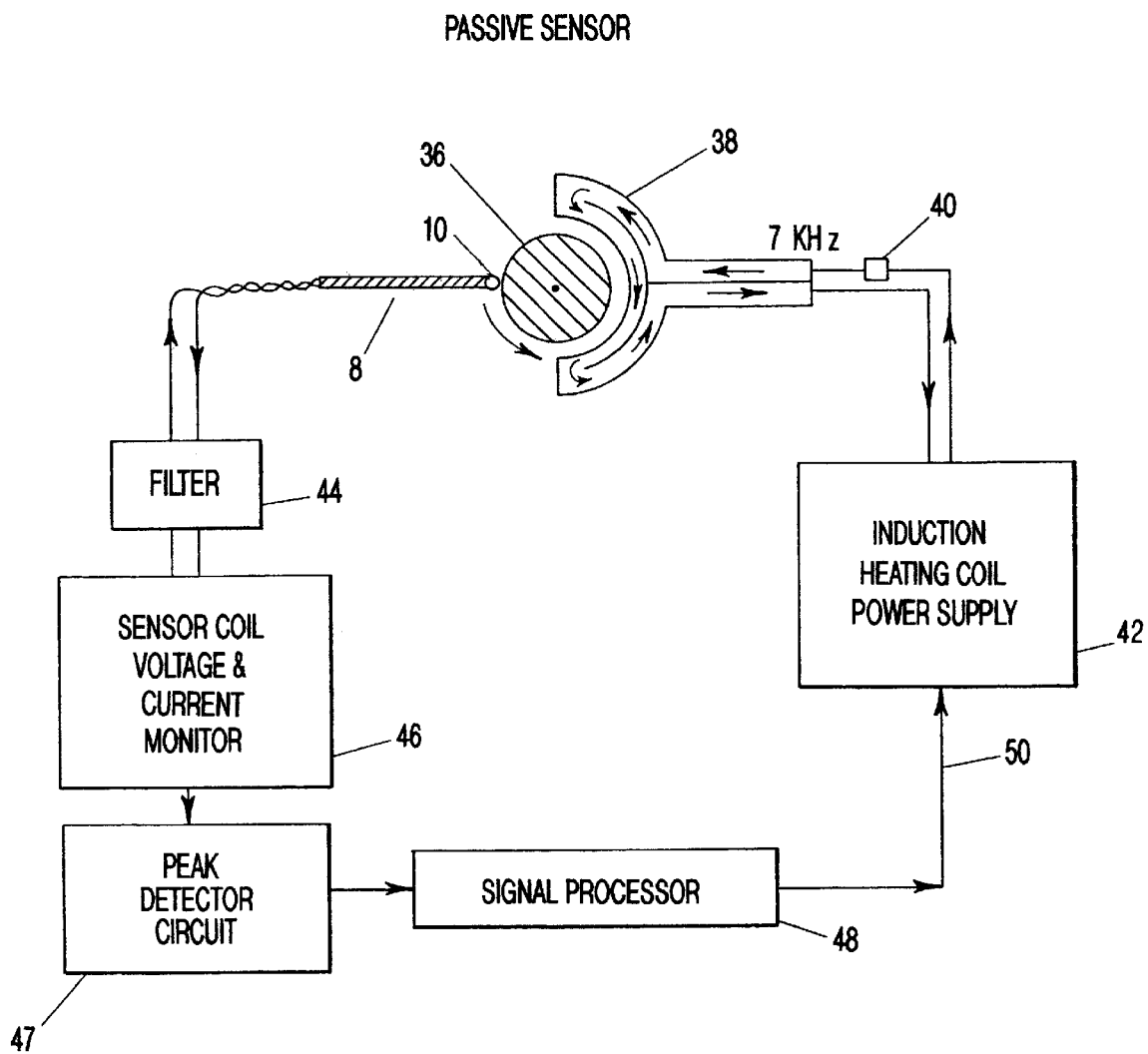
FIG. 9 shows a first schematic example, according to the present invention of a system for providing closed-loop control of the induction heating process, having a passive magnetic sensor.

FIG. 9 shows a first schematic example, according to the present invention, of a system for providing closed-loop control of the induction heating process, having a passive magnetic sensor. Workpiece 36 is shown partially surrounded by an inductive heating coil 38 having a hairpin-type geometry. Workpiece 36 can rotate about its longitudinal axis in order to improve the uniformity of heating. Rogowski coil 40 surrounds a current lead to heating coil 38. Rogowski coils are well known in the art, and respond to time-varying changes in the current passing through the coil (e.g. the derivative of the current with respect to time, dI/dt). The signal can then be integrated to provide actual current. Induction heating coil power supply 42 provides alternating current to heating coil 38. The driving frequency of the AC current to heating coil 38 can be 5–10 kHz, depending on the application. Passive magnetic sensor probe 8, with attached sensor coil 10, is positioned in close proximity to workpiece 36. Output signals from passive sensor 8 pass through electronic filter 44, which filters out unwanted electromagnetic interference. These signals are measured and recorded by a voltage and/or current monitor 46, (e.g. a 1 GHz bandwidth oscilloscope). Signal processor 48 processes the measured voltage and current signals. Signal processor 48 can be a microprocessor, digital signal processor chip, or an analog circuit, any of which is designed to perform simple, high speed math function on data signals. Signal processor 48 can calculate the phase angle of the signals. Additionally, signal processor 48 can compare the measured signals with preprogrammed waveforms to create an error signal that can be used to provide feedback control information to power supply 42 via control signal 50.

Alternatively, signal processor 48 can be used to calculate one or more attributes that can be derived from the waveforms of the measured sensor signals. Examples of suitable attributes include a measure of the deviation from non-sinusoidal behavior of the waveforms. For ferromagnetic materials, a useful attribute would be a calculation of the time, $t_{curie}$, when the Curie temperature point has been reached. As discussed above, $t_{curie}$, can be calculated in a number of different ways, including identifying the time when the magnetic spikes 24 disappear, or by identifying the characteristic shift in the plot of the intra-cycle phase angle versus time (e.g. curve 30 in FIG. 8), for a sensor 8 properly aligned to maximize the response to the induced eddy currents fields.

Signal processor 48, or analog electronics circuits, can compare the one or more calculated attributes of the measured sensor signals to one or more desired attributes to create an error signal. For example, the error signal can be the difference in time between the measured Curie temperature point, $t_{curie}$, and the desired time when the Curie point should have been reached. This difference in time can be used to create a control signal 50 that feeds back to the induction heating power supply 42. Feedback control signal 50 can be used to adjust the power level of the induction heating power supply 42, or the shut-off time, $t_{off}$, of the current used to drive the induction heating coil 38. The control signal can include a proportional adjustment in the operating parameter (e.g. power level or shut-off time). For example, if the measured Curie temperature point, $t_{curie}$, occurred at a time 10% longer than the desired time, then the power level or shut-off time could be increased by 10% to correct for the delayed Curie point response. Alternatively, signal processor 48 can utilize a more sophisticated algorithm for determining the correct amount of adjustment, which can be based on complex models for the workpiece's coupled thermal and electromagnetic behavior. Alternatively, the algorithm used by signal processor 48 can be a neural network program that has been previously trained with data taken from previous heating runs (as described by Adkins et al. in U.S. Pat. No. 5,630,957). The goal of making adjustments to power supply 42 is to reduce the magnitude of the error signal below a predetermined acceptable limit.

Control signal 50 can also be used to adjust the relative position of workpiece 36 with respect to heating coil 38.

This could be used for a workpiece that is being scanned (not shown) through a fixed heating coil 38.

The steps of measuring the sensors response, creating an error signal, and reducing the error signal by adjusting the machine's operation can be repeated as many times as needed during the induction heating period, in order to achieve the required parameters.

A specially designed electronic circuit 47 has been designed and used to automatically detect the disappearance of the magnetic spikes 24 at the Curie point magnetic transition 28. This peak detector circuit 47 comprises a band-pass filter, followed by a peak amplitude detector. The filter eliminates the lower frequency (e.g. 7 kHz) heating signal, and leaves only the magnetic spikes. The peak detector 47 produces a demodulated signal that is a measure of the changes in the B-H loop. Below the Curie temperature, this circuit has a large signal that goes essentially to zero when the Curie temperature is reached.

Figure 10:
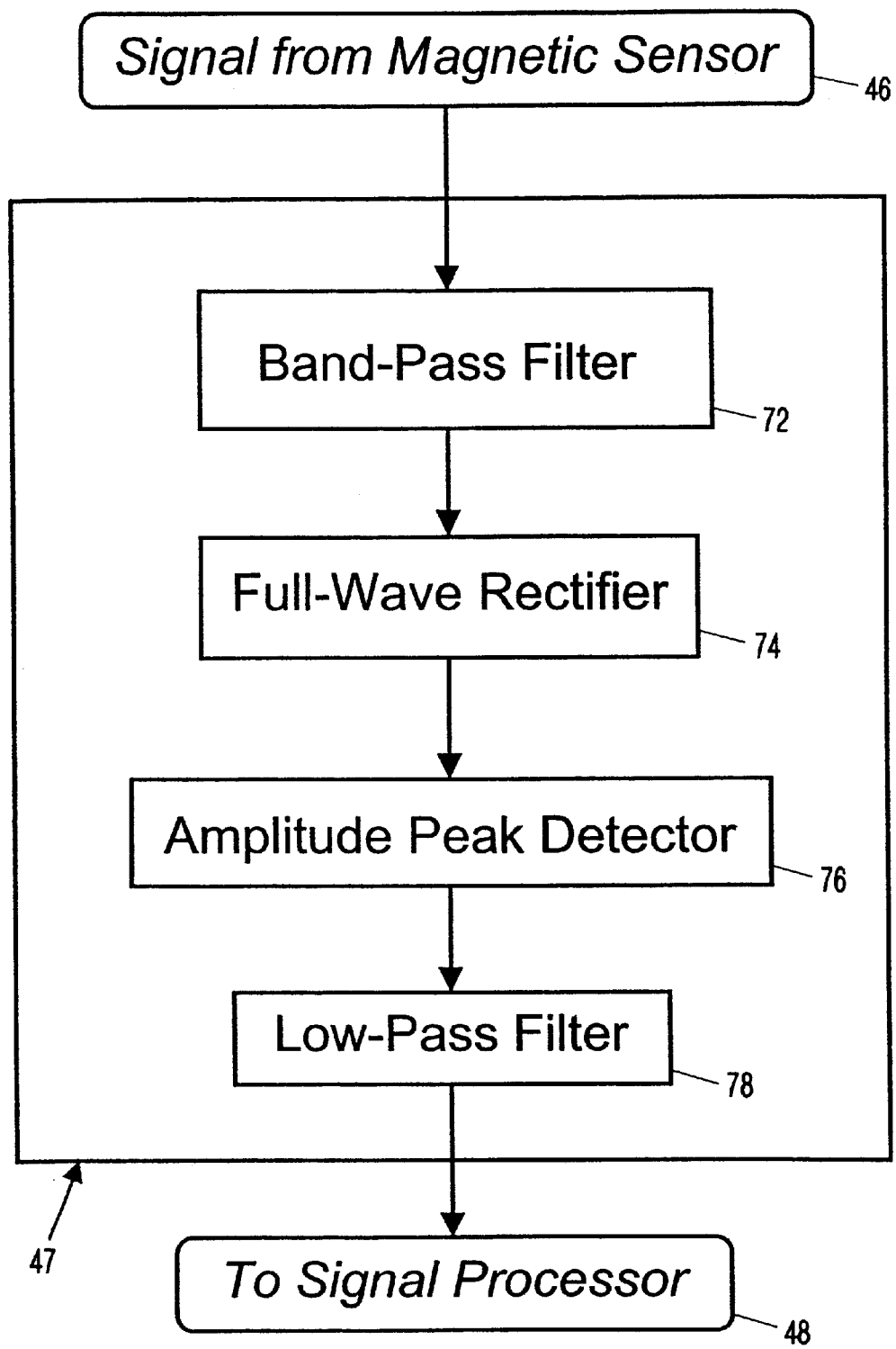
FIG. 10 shows a schematic block diagram of a first example of a peak detector circuit, according to the present invention.

FIG. 10 shows a schematic block diagram of a first example of a peak detector circuit 47, according to the present invention. One or more signals 46 from the magnetic sensor are fed into circuit 47. The first element in the peak detector circuit can be a band-pass filter 72. Band-pass filter 72 can be, for example, a fourth-order system with a center frequency of 250 kHz, a bandwidth of 74 kHz, and a damping ratio of 0.3. Band-pass filter 72 can be designed to reject the low-frequency induction heating signal, as well as higher-frequency measurement noise, while passing through the desired magnetic current spikes. Because the spikes have short rise-times, it is not practical to use digital sampling and filtering techniques to process the signals (requiring gigahertz sample rates and gigabytes of storage). Therefore, the band-pass filter 72 is preferably implemented with high-speed operational amplifiers using a two-stage Kerwin-Huelsman-Newcomb design.

The output of the band-pass filter 72 can be rectified using a precision analog full-wave rectifier circuit 74. Once rectified, the signal can be fed into the amplitude peak detector 76. Finally the output of the peak detector 76 can be processed by low-pass filter 78 to yield a low frequency signal that is proportional to the amplitude of the magnetic spikes. High-band width amplifiers with a minimum slew rate of 20 Volts/microsecond can be used for the first three stages of the peak detector circuit 47, while the low-pass filter section 78 can work with any standard operational amplifier. The output of peak detector circuit 47 goes to signal processor 48 for further analysis and/or for closed-loop process control.

Figure 11:
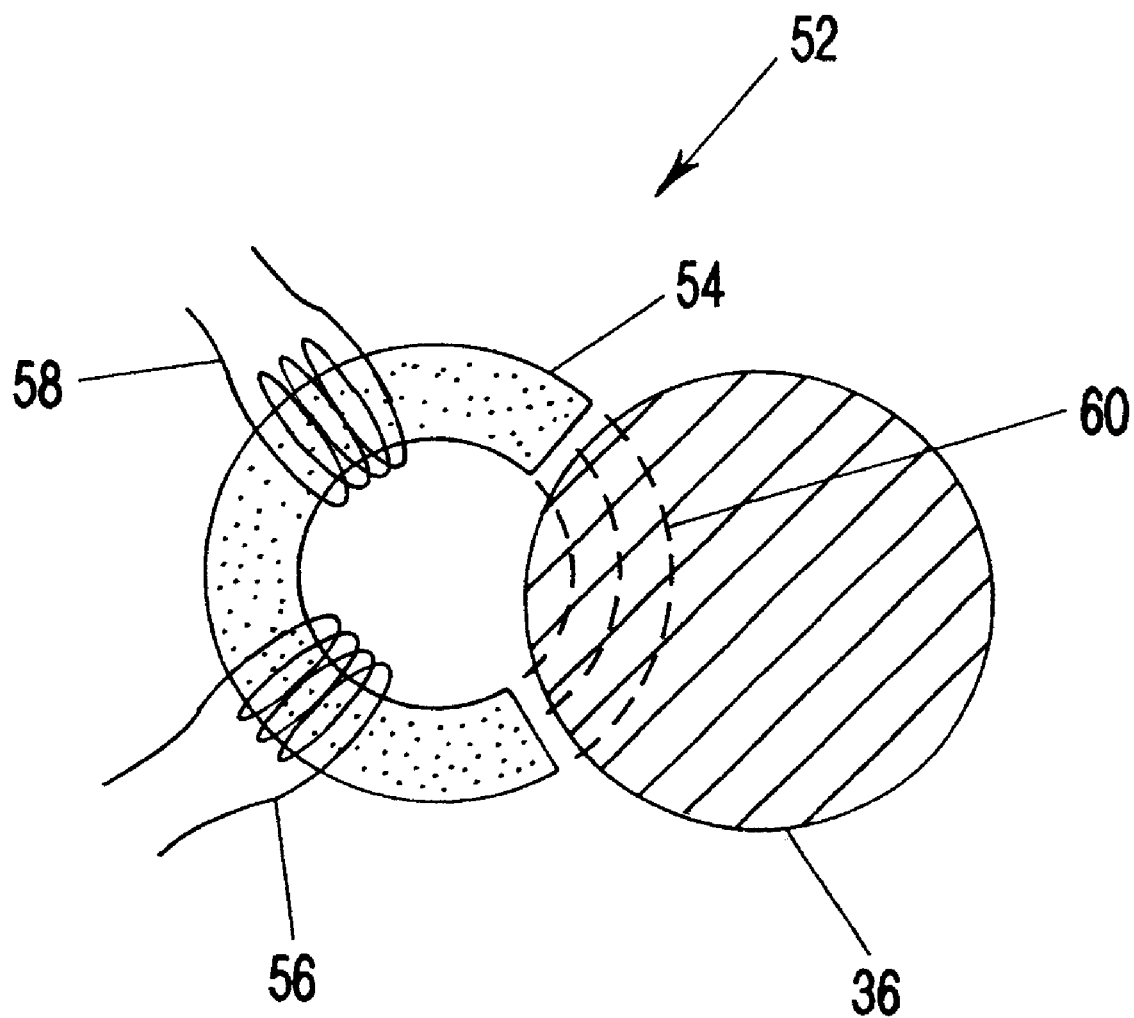
FIG. 11 shows a first schematic example, according to the present invention, of an active magnetic sensor.

Active magnetic sensors can also be used with the method and system described above for closed-loop control of the induction heating process. FIG. 11 shows a first schematic example, according to the present invention, of an active magnetic sensor 52. Sensor 52 comprises at least one miniature excitation coil 58 and at least one miniature monitor (e.g. sensor) coil 56. The coil windings can be wound around a toroidally-shaped ferrite core 54. The ferrite core 54 has low electrical conductivity, which minimizes the unwanted effects of induced eddy currents in core 54. The toroidal shape of the core 54, plus the magnetic material inside of core 54, can concentrate the magnetic flux lines 60 to penetrate the workpiece 36 in the near-surface region and connect back to the monitor coil 56. Other shapes can be used for a ferrite core 54, such as a linear core, or cylindrical core, as is well known in the art.

Monitor coil 56 responds primarily to the magnetic field generated by the excitation coil 58. A primary advantage of using an active magnetic sensor, compared to a passive magnetic sensor, is that the frequency of the active sensor (i.e. excitation coil 58) can be varied independently from the driving frequency of the induction heating coil 38 (which is typically fixed at around 5–10 kHz, but can be lower or higher, depending on the application). For example, the driving frequency of the excitation coil 58 can be swept from 0–10 MHz to change the depth of sensitivity, and to induce a wide range of response from the monitor coil 56. Alternatively, a broadband impulse "burst" can be used to drive excitation coil 58, which also provides a wide range of driving frequencies.

Active magnetic sensors can respond to at least four components of the total coupled magnetic fields. A first component can be the field generated by the induction heating coil 38. A second component can be the field generated by a first set of eddy currents flowing in the workpiece, where this first set of eddy currents have been induced by the action of the induction heating coil 38. A third component can be the field generated by the active sensor's excitation coil 58. A fourth component can be the field generated by a second set of eddy currents flowing in the workpiece, where this second set of eddy currents have been induced by the action of the active sensor's excitation coil 58.

Figure 12:
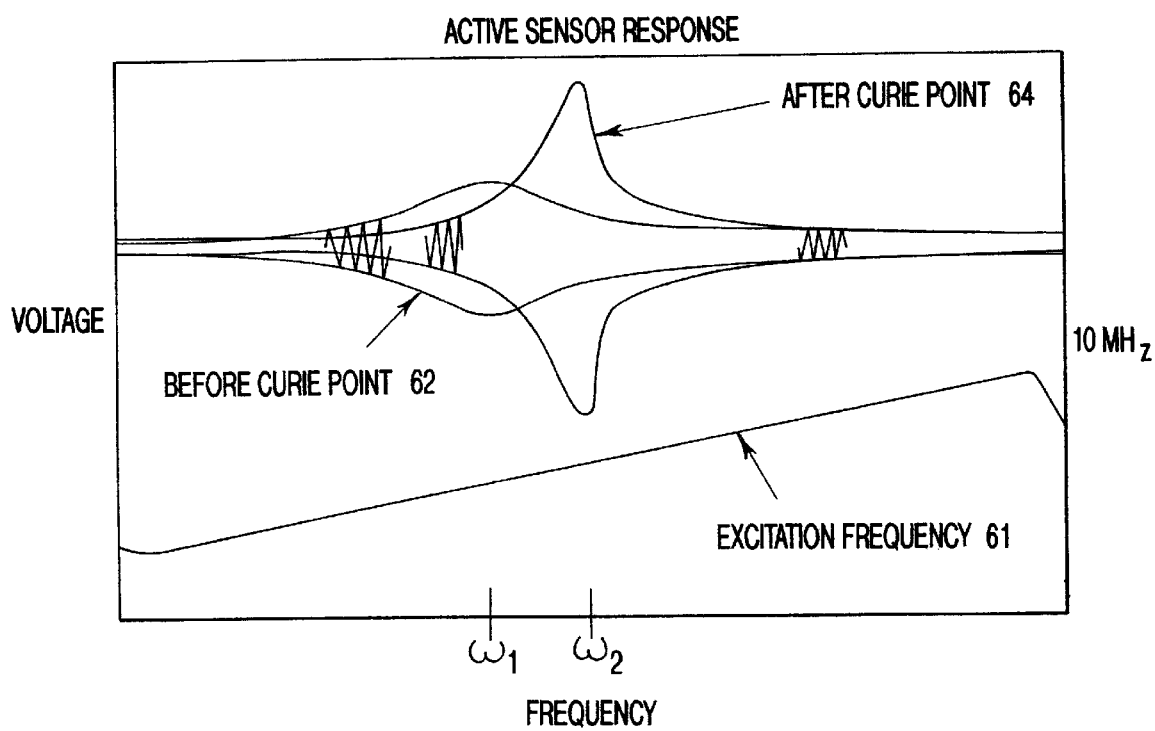
FIG. 12 shows a first example, according to the present invention, of the response of an active magnetic sensor before and after the Curie temperature point has been reached, where the excitation coil has been linearly swept over a frequency from 0–10 MHz.

FIG. 12 shows a first example, according to the present invention, of the response of an active magnetic sensor before and after the Curie temperature point has been reached, where the excitation coil has been linearly swept over a frequency from 0–10 MHz. Curve 61 shows the excitation frequency. Curve 62 shows the characteristic response of the monitor coil 56 (in Volts), as a function of the driving frequency from 0–10 MHz. A broad resonance can be observed at omega-1. At a later time, after the Curie temperature point has been reached, Curve 64 displays a number of altered features. In Curve 64, the resonance frequency has shifted to a higher value, omega-2. Also, the amplitude of the resonance has increased, as well as the "Q" value. Any three of these characteristic features of the response curve, or combinations of them, can be used as the attribute in the closed-loop control program to create the error signal used to provide the feedback control signal 50 to power supply 42.

Figure 13:
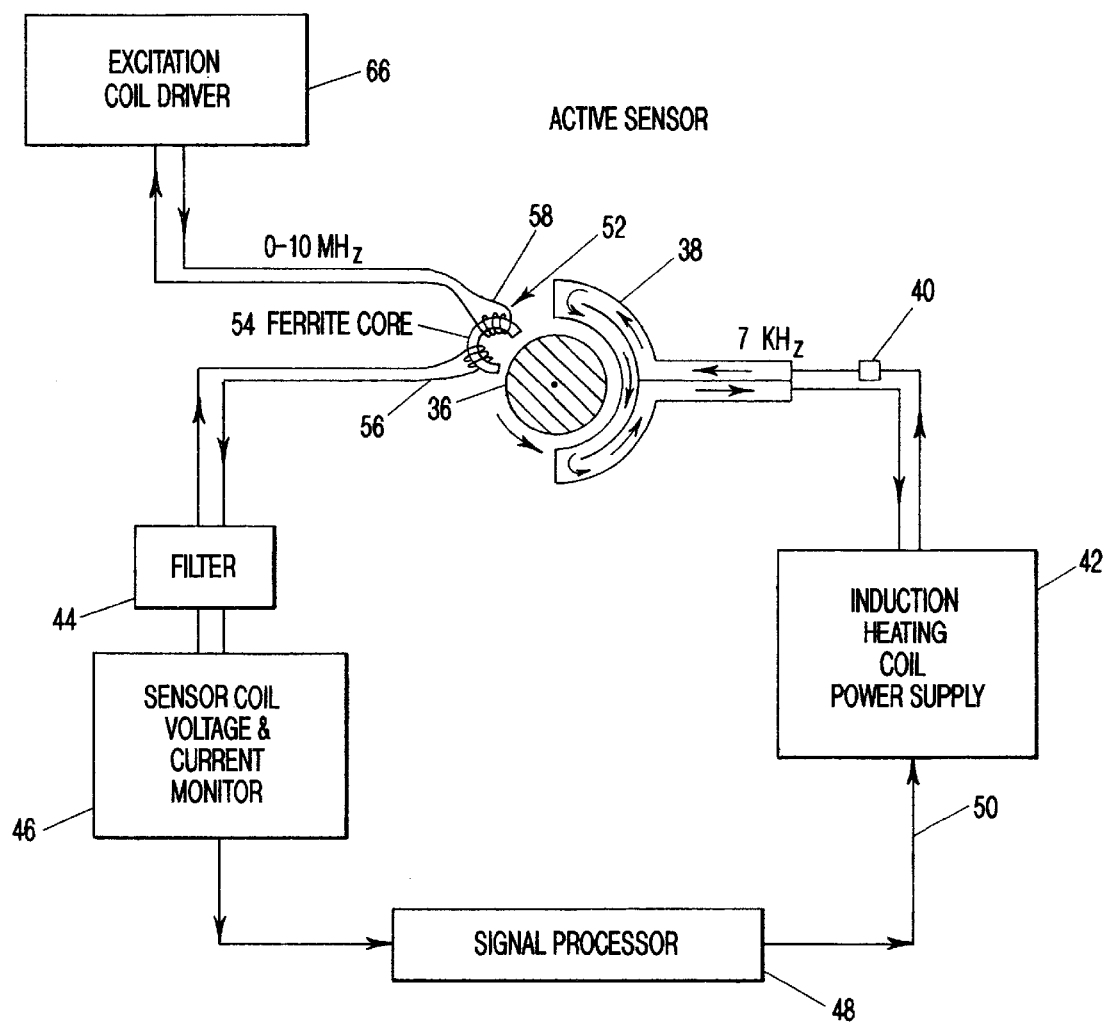
FIG. 13 shows a second schematic example, according to the present invention, of a system for providing closed-loop control of the induction heating process, having an active magnetic sensor.

FIG. 13 shows a second schematic example, according to the present invention, of a system for providing closed-loop control of the induction heating process, having an active magnetic sensor. The system is identical to that shown in FIG. 9, except that the passive magnetic sensor 8 has been replaced with an active magnetic sensor 52. Active sensor 52 has an excitation coil 58, which is driven by an excitation coil driver 66. Sensor 52 can have a toroidally-shaped core 54 Driver 66 Patent Application can sweep the frequency of excitation coil 58 from 0–10 MHz. Filter 44 can reduce electromagnetic interference from induction heating coil 38, thereby allowing active sensor 52 to be used during operation of an induction heating cycle.

When the methods and systems described above are applied to induction hardening machines, the error signal provides a useful feedback control to adjust, in real-time, the depth of case hardening, towards the desired value.

The particular sizes and equipment discussed above are cited merely to illustrate a particular embodiment of this invention. It is contemplated that the use of the invention may involve components or methods having different characteristics. For example, the method and system described above can be used to provide monitoring and/or closed loop control of a quenching machine. In this case, for example, with a ferromagnetic workpiece that has some portion already heated above the Curie temperature point 28, the present invention can be used to detect the point in time during cooling (e.g. quenching) when the sensors indicate a transition from being above the Curie temperature to being below the Curie temperature. This could manifest itself as the reappearance of spikes 24 in the intra-cycle curves of the passive sensor response, or as a characteristic shift in the phase angle. Or, with active sensors, as characteristic shifts in the resonance, amplitude, or "Q" value.

It is intended that the scope of the invention be defined by the claims appended hereto.

We claim:

1. A method of monitoring the process of induction heating a workpiece, comprising:
    (a) providing a workpiece having a region that is being heated by an induction heating coil, the workpiece having a time-varying total surface magnetic field comprising a primary magnetic field component generated by the induction heating coil, and a secondary magnetic field component generated by eddy currents induced in the workpiece by the induction heating coil;
    (b) placing a magnetic sensor outside of the workpiece in close proximity to the outer surface of the workpiece's heated region;
    (c) measuring the sensor's response to the time-varying total surface magnetic field, while the workpiece is being inductively heated;
    (d) identifying a unique feature of the sensor's response that is characteristic of changes in the magnetic properties of the workpiece while being induction heated; and
    (e) monitoring changes in said unique feature of the sensors response while the workpiece is being inductively heated.

2. The method of claim 1, further comprising measuring the time-varying voltage, current, and phase angle between the voltage and current, of the sensor's output.

3. The method of claim 1, wherein the magnetic sensor comprises a miniature coil having a diameter less than 3 mm; and a water-insoluble, electrically insulating coating surrounding the coil's windings.

4. The method of claim 3, further comprising:
    aligning the miniature coil's axis to be perpendicular to the induction heating magnetic field, thereby minimizing the sensors output signal responsive to the primary magnetic field component generated by the induction heating coil; and
    aligning the miniature coil's axis to be parallel to the eddy current induced magnetic field, thereby maximizing the sensor's output signal responsive to the secondary magnetic field component generated by eddy currents induced in the workpiece by the induction heating coil.

5. The method of claim 3, wherein the magnetic sensor comprises 30 gauge copper wire wound at least 50 times around a ceramic rod having a diameter of about 1–2 mm.

6. The method of claim 1, further comprising electronically filtering out electromagnetic interference from the sensor's output.

7. The method of claim 1, further comprising orienting the sensor to optimize the signal induced in the sensor by eddy currents flowing within the workpiece.

8. The method of claim 1, further comprising, after the workpiece has been heated, the step of quenching the workpiece by applying a quenching liquid to the workpiece from at least two sections of a quench head; wherein the magnetic sensor is mounted in a gap disposed between two adjacent sections of the quench head.

9. The method of claim 1, wherein the process of induction heating the workpiece comprises operating a FET-based inductive heating machine that provides continuously pulsed, near-sinusoidal operation without any dead time between heating cycles.

10. The method of claim 1, wherein the magnetic sensor comprises a passive magnetic sensor; and further wherein the step of identifying a unique feature of the sensor's response comprises:
    identifying a distinct magnetic spike in the sensor's output during an induction heating cycle that is caused by a sudden perturbation in the total surface magnetic field, due to local saturation of the magnetic permeability of the workpiece, which is created when the saturation magnetic field, $B_{sat}$, of the workpiece is exceeded.

11. The method of claim 10, wherein the step of identifying a distinct magnetic spike in the sensor's output comprises using a high bandwidth oscilloscope to record the signal outputted by the sensor.

12. The method of claim 10, further comprising detecting a disappearance of the distinct magnetic spike caused when the Curie temperature of the workpiece is exceeded; wherein the step of detecting the disappearance comprises:
    (e) filtering the sensor's output signal through a band-pass filter, thereby rejecting any low-frequency induction heating signal and rejecting any higher-frequency measurement noise, while allowing the distinct magnetic spike's signal to pass through;
    (f) rectifying the output of the band-pass filter from step e) using a precision analog full-wave rectifier circuit;
    (g) feeding the rectified signal from step f) into an amplitude peak detector module;
    (h) filtering the output of the amplitude peak detector module from step g) through a low-pass filter to yield a low frequency signal that is proportional to the amplitude of the distinct magnetic spike's signal; and
    (i) processing the low frequency signal from step h) in a signal processor, thereby detecting the disappearance of the distinct magnetic spike caused when the Curie temperature of the workpiece is exceeded.

13. The method of claim 12, wherein the band-pass filter is implemented with high-speed operational amplifiers using a two-stage Kervin-Huelsman-Newcomb design.

14. The method of claim 12, wherein steps e), f), and g) comprise using at least one high-band width amplifier with a minimum slew rate of 20 Volts/microsecond.

15. The method of claim 12, wherein the band-pass filter used in step e) comprises a fourth-order system with a center frequency of 250 KHz, a bandwidth of about 74 KHz, and a damping ratio of 0.3.

16. The method of claim 1, wherein the magnetic sensor comprises an active magnetic sensor, which comprises an excitation coil and a monitor coil; and wherein the method further comprises:
    generating an excitation magnetic field by energizing the miniature excitation coil; and
    measuring the response of the monitor coil to the total magnetic field generated by the induction heating coil and the excitation coil.

17. The method of claim 16, further comprising, during induction heating:
    (e) sweeping the driving frequency of the excitation coil from 0–10 MHz;
    (f) generating a first output spectrum by measuring the monitor coil's output over the swept frequency range of 0–10 MHz; and (g) identifying a first resonance in the first output spectrum; then (h) repeating steps (e) through (g), thereby generating a second output spectrum;

(i) indentifying a second resonance in the second output spectrum;

(j) comparing the first and second output spectra; and (k) indentifying a characteristic change between the first and second output spectra that is caused when the Curie temperature of the workpiece is exceeded during induction heating.

18. The method of claim 17, wherein the characteristic change between the first and second output spectra comprises an attribute selected from the group consisting of a shift in the output spectrum's resonance frequency, a change in the amplitude of the output spectrum's resonance, and a shift in the "Q"-value of the output spectrum.

19. The method of claim 16, wherein energizing the miniature excitation coil comprises using a broadband impulse burst to drive the miniature excitation coil, whereby a wide range of driving frequencies are produced.

20. A method of detecting the time, $t_{curie}$, as measured from the start of induction heating, when the surface temperature of a ferromagnetic workpiece has exceeded the Curie temperature during induction heating, comprising:

(a) providing a ferromagnetic workpiece having a region that is being heated by an induction heating coil, the workpiece having a time-varying surface magnetic field;

(b) placing a magnetic sensor in close proximity to the heated region;

(c) measuring the sensor's response to the time-varying surface magnetic field, while the workpiece is being inductively heated;

(d) calculating the time rate of change of the surface magnetic field, dB/dt, as a function of time, from the sensor's output;

(e) plotting the intra-cycle variation in dB/dt versus time for at least one cycle of induction heating;

(f) identifying a characteristic spike in the plot of dB/dt versus time, caused by a perturbation in the surface magnetic field due to saturation of the magnetic permeability;

(g) identifying when the spike disappears, due to the loss of magnetic properties when the workpiece surface temperature exceeds the Curie temperature; and (h) identifying the time, $t_{curie}$, when the spike disappearance occurs.

21. The method of claim 20, wherein the magnetic sensor comprises a passive sensor.

22. A method of detecting the time, $t_{curie}$, as measured from the start of induction heating, when the surface temperature of a ferromagnetic workpiece has exceeded the Curie temperature during induction heating, comprising:

(a) providing a ferromagnetic workpiece having a region that is being heated by an induction heating coil, the workpiece having a time-varying surface magnetic field;

(b) placing a magnetic sensor in close proximity to the heated region;

(c) measuring the sensor's response to the time-varying surface magnetic field, while the workpiece is being inductively heated;

(d) calculating the phase angle of the sensor's output relative to the phase of the applied induction heating field;

(e) plotting the intra-cycle phase angle versus time, over the period of induction heating;

(f) identifying a characteristic shift in the plot of phase angle versus time, due to the loss of magnetic properties when the workpiece surface temperature exceeds the Curie temperature; and (g) identifying the time, $t_{curie}$, when the characteristic shift occurs.

23. The method of claim 22, wherein the magnetic sensor comprises a passive sensor.

\* \* \* \* \*